Patented July 13, 1926.

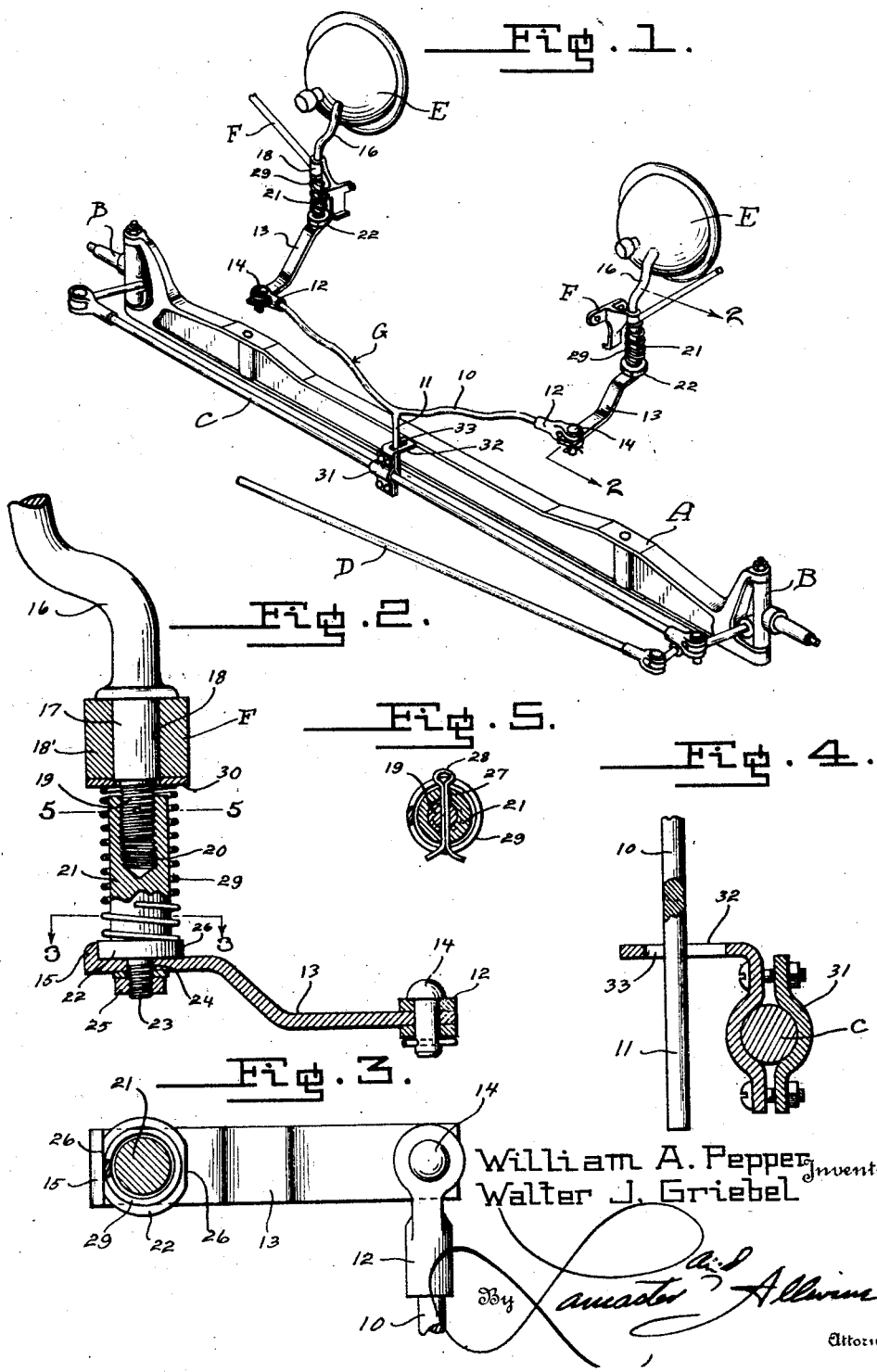

1,592,537

UNITED STATES PATENT OFFICE.

WILLIAM A. PEPPER AND WALTER J. GRIEBEL, OF TULSA, OKLAHOMA.

DIRIGIBLE HEADLIGHT FOR AUTOMOBILES.

Application filed October 21, 1924. Serial No. 744,961.

The present invention relates in general to motor vehicles and the like, and more particularly to automatic dirigible headlights therefor.

The primary object of the invention being to provide a novel means for actuating the lamps of a vehicle in unison with the operation of the steering gear, so that as the front wheels of the vehicle are moved in one direction or the other, the path of the vehicle will be effectively illuminated upon each deviation of the vehicle from a straight path.

Another object of the invention is to provide a means for automatically directing the shaft of light from the headlights of a vehicle in accordance with the direction in which the wheels are moved, which may be easily adjusted to the vehicle without any material changing of any of the original structure thereof, one which is simple in construction, and one which may be placed upon the market at a reasonable price to the purchaser.

Other objects and advantages of the invention will be apparent during the course of the following detailed description, taken in connection with the accompanying drawings, forming a part of this specification, and in which drawing:

Figure 1 is a perspective view of a portion of an automobile showing the device applied thereto.

Figure 2 is an enlarged sectional view taken on line 2—2 of Figure 1.

Figure 3 is a sectional view on line 3—3 of Figure 2.

Figure 4 is an enlarged detail section through a coupling for connecting the device to the steering gear of an automobile.

Figure 5 is a section on line 5—5 of Figure 1.

Referring to the drawing in detail, wherein for the purpose of illustration is shown but the preferred embodiment of the invention, and wherein similar reference characters designate corresponding parts throughout the several views, the letter A may designate the front axle of an automobile having steering knuckles B mounted at each end thereof for rotatable and swinging mounting of the front or steering wheels of the vehicle; C a tie rod connecting the steering knuckles B; and D the usual steering rod connecting the tie rod C with a conventional type of steering column not shown. The letter E may designate the headlight lamps of the vehicle which are pivotally mounted in laterally extending bracket arms F mounted upon the forepart of the vehicle; and G may generally designate the improved means for actuating the lamps of the vehicle in unison with the operation of the steering gear of the vehicle.

Referring more in detail to the means G, the numeral 10 may designate a connecting bar provided with a centrally disposed depending arm 11 and having adjustably secured to its free end portions, yokes 12 for pivotal connection with the rear ends of arms 13 as by pivot pins 14.

These arms 13 may be formed from flat strips of metal and have their forward ends turned upwardly for providing lock flanges 15 for a purpose to be subsequently set forth.

The standards 16 of the headlights E have their lower tubular shank portions 17 revolubly mounted in vertical bores 18 provided in the usual sockets 18' of the arms F, with the reduced threaded shank portions 19 thereof extending below the sockets as is a well known construction employed upon certain vehicles for mounting of the headlights. These threaded shank portions 19 are adapted for threaded engagement within screw threaded bores 20 provided in the upper ends of stem extensions 21, which are rigidly carried by the forward end of each of the arms 13.

These stem extensions 21 which are disposed coaxially of the shanks 17, are each provided at their lower ends with annular shoulders 22, and beneath which extend threaded shanks 23 which are adapted to pass through vertically extending openings 24 provided adjacent the forward ends of the arms 13, for receiving locking nuts 25 for retaining the stems in adjusted vertical position upon the arms. These shoulders 22 are provided with flattened surfaces 26 which are adapted to engage the lock flanges 15 for preventing rotation of the stems with respect to the arms 13. A transversely extending hole 27 is provided adjacent the upper end of each stem 21, and is adapted to be aligned with the usual cotter pin hole provided in the threaded shank portion 19, in order that a cotter pin 28 may be forced through the aligned openings for causing the standard 16 to rotate with the stem.

These stems 21 are turned upon the shanks 19 until a slight gap exists between the upper ends of the stems and the lower ends of the sockets 18′, and expansion coil springs 29 are placed about the stems 21 with one end thereof bearing upon the shoulder 22 and the opposite ends bearing against wearing washers 30 fitting against the under faces of the sockets 18′. These springs 29 will act as yieldable means for retaining the lamp standards in a substantially rigid, yet rotatable position within the sockets 18′.

A clamp 31 is rigidly secured centrally of the tie rod C, and has a horizontally projecting wing 32 which is provided with an elongated slot 33 for receiving the depending arm 11 of the connecting bar 10. This means of connection between the lamps and steering gear of the vehicle permits of the relative movement of one with respect to the other, due to the resilient mounting of the vehicle body which supports the lamps.

The connecting bar 10 and levers 13 are so formed and assembled as to permit of the device being readily applied to vehicle frames without interfering with or necessitating a change in construction of any parts of the frame.

It will be apparent from the foregoing description that a novel and efficient dirigible headlight has been provided which may be readily applied to existing types of lamp standards and supporting brackets therefor, without the necessity of materially changing the parts in order to apply the device in operative relation with the lamps.

Various changes in the shape, size and arrangement of parts may be made to the form of the invention herein shown and described, without departing from the spirit of the invention or the scope of the claims.

We claim:—

1. In a dirigible headlight construction the combination with a bracket having a vertical bore, and a lamp having a supporting standard with its lower end portion supported upon the bracket and extending through said bore with a threaded shank portion thereof projecting below the bracket, of a stem extension having a threaded bore at its upper end for screw threaded reception of the threaded shank portion and provided at its lower end with an annular shoulder, adapted to be disposed with its upper end spaced below the lower portion of said bracket, an expansion coil spring positioned about the stem extension with one end in engagement with said annular shoulder for yieldably retaining the lamp standard in the vertical bore of the lamp bracket, and an operating arm detachably secured to the stem extension below the annular shoulder thereof for imparting rotary movement to the lamp standard.

2. In a dirigible headlight construction the combination with a bracket having a vertical bore, and a lamp having a supporting standard with its lower end portion supported upon the bracket and extending through said bore with a threaded shank portion thereof projecting below the bracket, of a stem extension having a threaded bore at its upper end for screw-threaded reception of the threaded shank portion and having its upper portion spaced from the lower portion of said bracket, an annular shoulder formed at the lower end of the stem extension and having flattened surfaces provided on its peripheral edge, an expansion coil spring positioned about the stem extension with one end in engagement with said annular shoulder for yieldably retaining the lamp standard in the vertical bore of the lamp bracket, and an operating arm detachably secured to the stem extension below the annular shoulder, having a locking flange adapted to engage the flattened surfaces of the annular shoulder for preventing relative movement of the stem with respect to the operating arm.

WILLIAM A. PEPPER.
WALTER J. GRIEBEL.